United States Patent
Tadakuma et al.

(10) Patent No.: US 11,433,553 B2
(45) Date of Patent: Sep. 6, 2022

(54) SUCTION GRIPPER

(71) Applicants: TOHOKU UNIVERSITY, Miyagi (JP); PANASONIC CORPORATION, Osaka (JP)

(72) Inventors: Kenjiro Tadakuma, Miyagi (JP); Masahiro Watanabe, Miyagi (JP); Yu Kaneda, Nara (JP); Ryou Toshima, Nara (JP)

(73) Assignees: TOHOKU UNIVERSITY, Miyagi (JP); PANASONIC HOLDINGS CORPORATION, Osaka (JP)

( * ) Notice: Subject to any disclaimer, the term of this patent is extended or adjusted under 35 U.S.C. 154(b) by 54 days.

(21) Appl. No.: 17/077,621

(22) Filed: Oct. 22, 2020

(65) Prior Publication Data

US 2021/0122063 A1 Apr. 29, 2021

(30) Foreign Application Priority Data

Oct. 24, 2019 (JP) .............................. JP2019-193558

(51) Int. Cl.
  *B25J 15/00* (2006.01)
  *B25J 15/06* (2006.01)

(52) U.S. Cl.
  CPC ....... *B25J 15/0023* (2013.01); *B25J 15/0608* (2013.01)

(58) Field of Classification Search
  CPC .......................... B25J 15/0023; B25J 15/0608
  See application file for complete search history.

(56) References Cited

U.S. PATENT DOCUMENTS

| 6,846,029 | B1 * | 1/2005 | Ragner | B25B 9/00 |
| | | | | 294/219 |
| 8,548,626 | B2 * | 10/2013 | Steltz | B25J 15/0023 |
| | | | | 294/213 |
| 10,946,532 | B2 * | 3/2021 | Ishida | B25J 15/0028 |

(Continued)

FOREIGN PATENT DOCUMENTS

| JP | H09-123082 A | 5/1997 |
| JP | 2008-528408 A | 7/2008 |

(Continued)

OTHER PUBLICATIONS

Watanabe, et al., "Certificate for Seeking Exception to Loss of Novelty of Invention", explaining disclosure of "Jamming Gripper Mechanism Capable of Large Deformation by Double Symmetric Arrangement" at The Robotics and Mechatronics Conference 2019 on Jun. 5, 2019 in Hiroshima, Japan.

*Primary Examiner* — Stephen A Vu
(74) *Attorney, Agent, or Firm* — Pearne & Gordon LLP (57) ABSTRACT

Suction gripper 14 includes fixing member 1 including hole part 7, grasping part 2 including a plurality of flexible and airtight bag parts 2a and 2b whose interiors are coupled together in the central axis direction of hole part 7 with fixing member 1 therebetween, the plurality of bag parts 2a and 2b being filled with powder 8 or particles and fluid, and hardening unit 3 configured to harden the plurality of bag parts 2a and 2b. Grasping part 2 has a configuration in which when a workpiece is pushed against any of the plurality of bag parts 2a and 2b, the contact portion with the workpiece conform to the shape of the workpiece while the other bag part expands in accordance with the deformation.

4 Claims, 4 Drawing Sheets

(56) References Cited

U.S. PATENT DOCUMENTS

| | | | | |
|---|---|---|---|---|
| 2009/0242719 A1* | 10/2009 | Carnevali | .......... | F16M 11/2078 |
| | | | | 248/346.2 |
| 2010/0054903 A1* | 3/2010 | Jones | ...................... | B66C 1/445 |
| | | | | 414/800 |
| 2013/0106127 A1* | 5/2013 | Lipson | ................. | B25J 15/0023 |
| | | | | 294/189 |
| 2019/0210231 A1 | 7/2019 | Ishida et al. | | |

FOREIGN PATENT DOCUMENTS

| | | |
|---|---|---|
| JP | 2013-086185 A | 5/2013 |
| JP | 5822110 B2 | 11/2015 |
| JP | 2016-097496 A | 5/2016 |
| JP | 2018-079561 A | 5/2018 |
| JP | 6385014 B | 9/2018 |

\* cited by examiner

SUCTION GRIPPER

TECHNICAL FIELD

The present disclosure relates to a suction gripper provided in a grasping apparatus or a robot.

BACKGROUND ART

The harsh surrounding Japanese factories is extremely harsh under the influence of labor shortage due to a decrease in population. Under such a circumstance, automation of production process has been developed, but it is challenging to assemble diverse components in recent years' small volume production of large number of kinds of products using a common tool.

Assembly tools use an end effector to grasp components. A method has been proposed in which a mechanism whose rigidity can be changed is mounted in an end effector for the purpose of grasping various objects using the same end effector.

As an example of a rigidity variable mechanism, a bag gripper apparatus, which is a kind of suction gripper, is known. The bag gripper apparatus has a configuration in which a material whose rigidity is switchable is provided in the internal space of a bag member. The bag gripper apparatus grasps an object by pressing the bag member in a soft state against an object so as to fit the bag member to the shape of the object, and then switching the interior of the bag member to a hard state so as to maintain the wrapping shape of the bag member.

As a method of switching between soft and hard states, methods have been proposed in which a bag member provided with powder therein is vacuumed to cause jamming transition. A bag gripper apparatus disclosed in PTL 1 has a configuration in which a bag member has a hemispherical shape such that the pressing force of the bag member to an object is easily transferred to the powder. A bag gripper apparatus disclosed in PTL 2 is designed to increase the grasping force, with a configuration including an annular bag member and a suction mechanism for suctioning the interior of the bag member, in which suction is performed using the suctioning mechanism. A bag gripper apparatus disclosed in PTL 3 is designed to achieve a function of maintaining the fluidity of powder, with a configuration in which a port for sending air to a bag member and a port for venting air are disposed at different positions so as to cause air flow inside the bag member. Furthermore, a bag gripper apparatus that employs magnetic fluid as a material contained in a bag member so as to switch between soft and hard states using a magnetic force (PTL 4) and the like have been proposed.

CITATION LIST

Patent Literature

PTL 1
Japanese Patent Publication No. 5822110
PTL 2
Japanese Patent Application Laid-Open No. 2018-79561
PTL 3
Japanese Patent Application Laid-Open No. 2013-86185
PTL 4
Japanese Patent Publication No. 6385014

SUMMARY OF INVENTION

Technical Problem

The grasping performance of the bag gripper apparatus depends mainly on the deformable capacity of the bag member. An object of the present disclosure is to provide a suction gripper that can grasp various objects with increased deformable capacity of a bag member.

Solution to Problem

To achieve the above-mentioned object, a suction gripper of the present disclosure is configured to grasp a workpiece, the suction gripper including a fixing member including a hole part; a grasping part including a plurality of bag parts, the plurality of bag parts being disposed with the hole part interposed between the plurality of bag parts such that interiors of the plurality of bag parts are coupled together in a central axis direction of the hole part, the interiors of the plurality of bag parts being filled with powder or particles and fluid, the plurality of bag parts having flexibility and airtightness; and a hardening unit configured to harden the plurality of bag parts, wherein the grasping part has a configuration in which when the workpiece is pushed against any of the plurality of bag parts, a contact portion of the any of the plurality of bag parts with the workpiece deform to conform to a shape of the workpiece while another bag part of the plurality of bag parts expands in accordance with deformation of the contact portion.

Advantageous Effects of Invention

The suction gripper of the present disclosure can grasp various objects.

DESCRIPTION OF EMBODIMENTS

Embodiments of the present disclosure will be described below with reference to the drawings.

Embodiment 1

Figure 1:
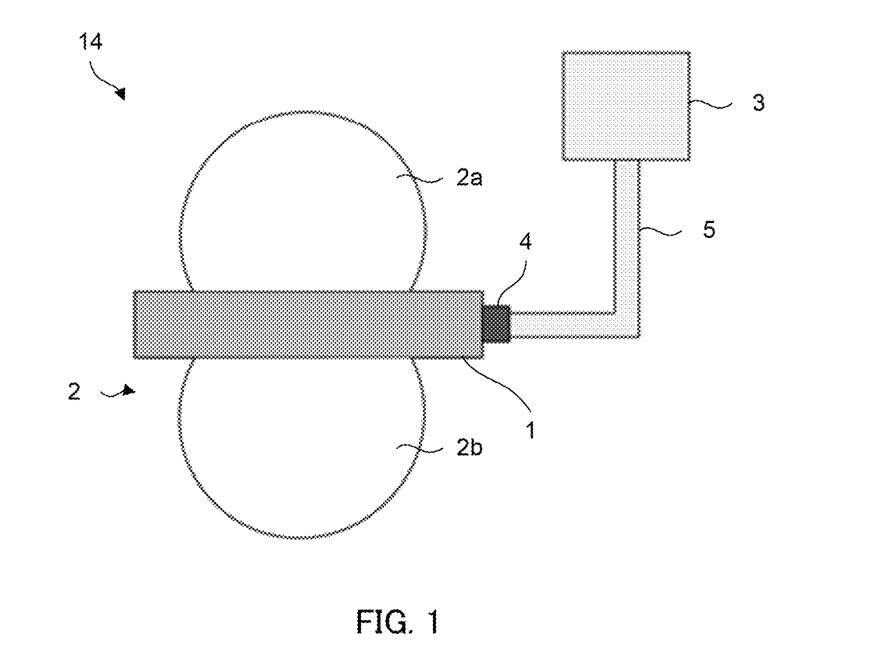
FIG. 1 is a schematic side view of a suction gripper of Embodiment 1 of the present disclosure.

FIG. 1 is a schematic side view of suction gripper 14 of Embodiment 1 of the present disclosure. In FIG. 1, the reference numeral 1 represents a fixing member, the reference numeral 2 represents a grasping part, the reference numerals 2a and 2b represent bag parts included in grasping part 2, the reference numeral 3 represents a hardening unit, the reference numeral 4 represents a port, and the reference numeral 5 represents a connecting member.

Fixing member 1 is composed of a material having a rigidity greater than that of bag part 2a and bag part 2b of grasping part 2.

Grasping part 2 is composed of at least two bag members, bag part 2a and bag part 2b. Except in a portion connected with port 4, grasping part 2 is air-tightly sealed, and is filled with powder and air. Bag parts 2a and 2b have flexibility, and can flexibly conform to the shape of a workpiece. As described later, bag part 2a and bag part 2b share the internal space.

After bag part 2a or bag part 2b is pressed against and brought into intimate contact with a workpiece so as to wrap and conform to the workpiece, hardening unit 3 hardens bag parts 2a and 2b by suctioning the air in bag parts 2a and 2b to increase the bulk density of the powder in bag parts 2a and 2b. As a result, bag part 2a or bag part 2b is hardened in the state where the workpiece is wrapped therein, and thus suction gripper 14 of the present disclosure can grasp the workpiece.

While hardening unit 3 is a vacuum pump since the fluid in bag parts 2a and 2b is air in the present disclosure, this is not limitative, and hardening unit 3 may be a liquid pump when the fluid is water or oil. Hardening unit 3 may be appropriately selected in accordance with the fluid to be used. In addition, while the hardening unit of the present disclosure hardens bag parts 2a and 2b by depressurizing bag parts 2a and 2b, bag parts 2a and 2b may be hardened by the following method. For example, a bag member filled with fluid is provided inside and/or outside bag parts 2a and 2b. Thus, by pressurizing the interior of the bag member to reduce the volume of the portion provided with powder in bag parts 2a and 2b, bag parts 2a and 2b may be hardened. Alternatively, bag parts 2a and 2b are filled with magneto rheological fluid (MR fluid) that is liquid (fluid) in which magnetic particles (particles) are dispersed, instead of powder and air. Thus, by applying a magnetic field to a magnetic fluid by a permanent magnet or an electromagnet serving as the hardening unit so as to increase the viscosity of the magnetic fluid, bag parts 2a and 2b may be hardened. Alternatively, bag parts 2a and 2b are filled with electrorheological fluid (ER fluid) that is insulating liquid (fluid) in which insulating particles (particles) are dispersed instead of powder and air. Thus, by applying an electric field to the electrorheological fluid by an electric field application unit serving as the hardening unit so as to increase the viscosity of the electrorheological fluid, bag parts 2a and 2b may be hardened. In particular, when functional fluid such as magnetic fluid and electrorheological fluid is used, a workpiece can be grasped even in a vacuum environment such as space.

Port 4 is connected to the internal space of bag parts 2a and 2b such that the fluid in bag parts 2a and 2b can be put in and out. While port 4 is disposed in fixing member 1 in this example, this is not limitative, and port 4 may be disposed in bag parts 2a and 2b.

Connecting member 5 connects between port 4 and hardening unit 3, and is, in this example, a pipe in which fluid can pass. Note that connecting member 5 may serve also as port 4. While hardening unit 3 is disposed outside fixing member 1 in this example, port 4 and connecting member 5 may not be disposed in the case where hardening unit 3 is disposed inside fixing member 1.

Figure 2:
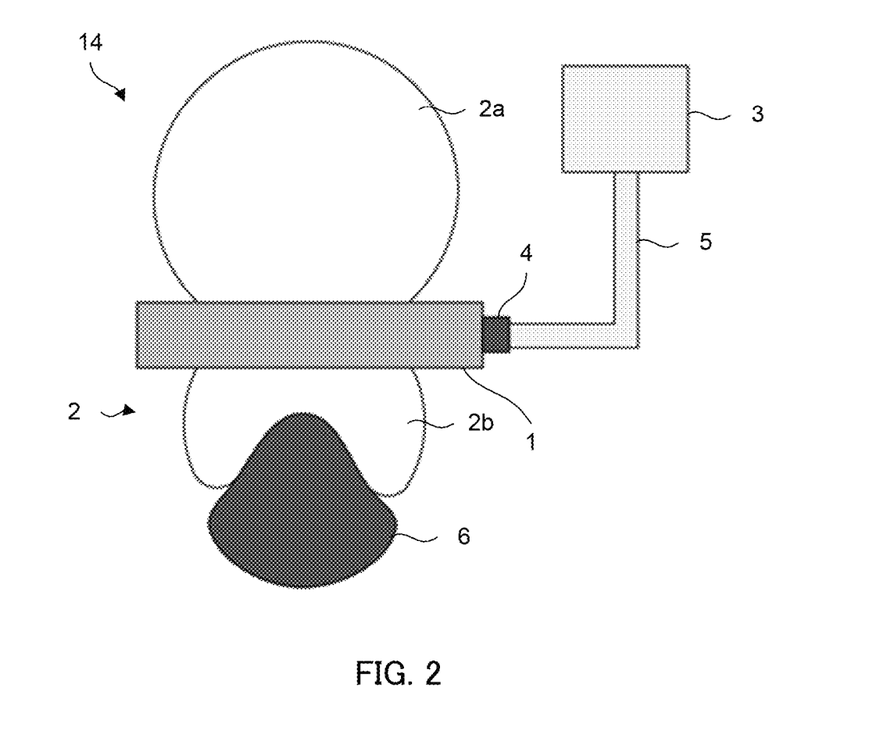
FIG. 2 is a schematic side view of a state where the suction gripper of Embodiment 1 of the present disclosure grasps a workpiece.

FIG. 2 is a schematic side view of a state where suction gripper 14 of Embodiment 1 grasps a workpiece. In FIG. 2, the reference numeral 6 represents a workpiece.

Bag part 2a and bag part 2b share the internal space, and therefore, when bag part 2b is pushed by workpiece 6 to fixing member 1 side, a part of the air and the powder of bag part 2b moves to bag part 2a in accordance with the pushing, and, the bag part 2a expands. In accordance with the expansion of bag part 2a, the deformable capacity of bag part 2b increases, and thus various objects can be grasped. In such a state, suction gripper 14 depressurizes the interior of bag parts 2a and 2b using hardening unit 3 to grasp workpiece 6. In addition, suction gripper 14 opens the interior of bag parts 2a and 2b to the atmosphere to release the grasp of workpiece 6. While suction gripper 14 releases the grasp of workpiece 6 by opening the interior of bag parts 2a and 2b to the atmosphere in this example, this is not limitative, and the grasp may be released by pressurizing the interior of bag parts 2a and 2b.

Bag part 2b can be more intimately brought into contact with workpiece 6 by, after pressing bag part 2b against workpiece 6, once pressurizing the interior of bag parts 2a and 2b and then depressurizing the interior of bag parts 2a and 2b.

The pressure for grasping workpiece 6 by depressurizing bag parts 2a and 2b is approximately a gage pressure of −100 kPa, for example. The hardness of bag parts 2a and 2b can be adjusted by the value of the pressure.

In the case where the grasp of workpiece 6 is released by pressurizing bag parts 2a and 2b, the higher the pressure, the earlier the reset of the recess for the workpiece in bag part 2b.

When pressurizing bag parts 2a and 2b, the pressure is limited such that plastic deformation of bag parts 2a and 2b does not occur. In the case where there is a risk of plastic deformation of bag parts 2a and 2b, it is desirable to provide a pressure valve in connecting member 5 to set a configuration capable of releasing the excessively high pressure.

The shape of workpiece 6 is not limited. In addition, desirably, workpiece 6 is an object that does not damage bag parts 2a and 2b. Examples of workpiece 6 that damages bag parts 2a and 2b include an object on which an agent that melts bag parts 2a and 2b is applied, and an object that can impair the airtightness of bag parts 2a and 2b by puncturing bag parts 2a and 2b and making a hole.

While workpiece 6 is grasped by bag part 2b in this example, workpiece 6 may be grasped also by bag part 2a.

Figure 3:
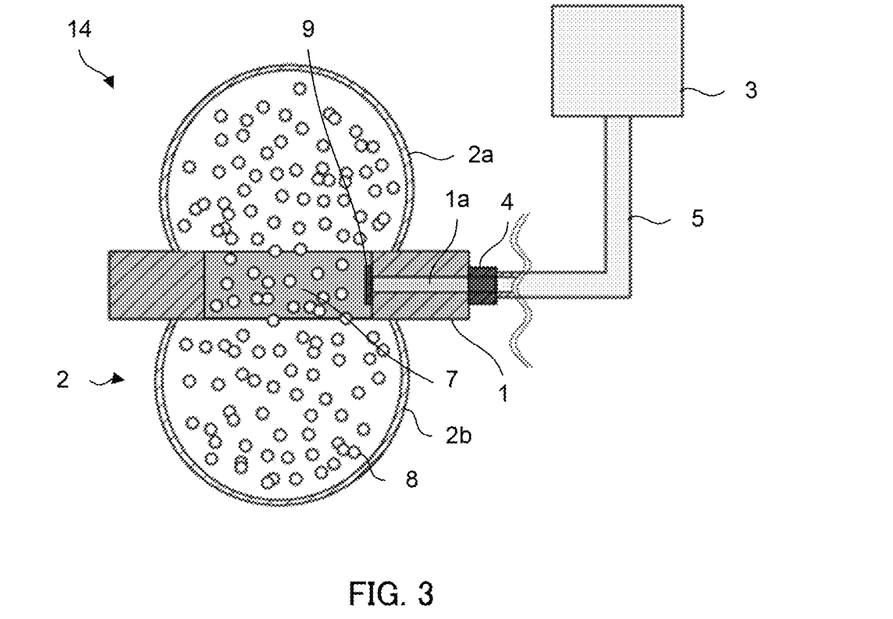
FIG. 3 is a side sectional view illustrating the suction gripper of Embodiment 1 of the present disclosure.

FIG. 3 is a side sectional view of suction gripper 14 of Embodiment 1. In FIG. 3, the reference numeral 7 represents a hole part, the reference numeral 8 represents powder, and the reference numeral 9 represents a filter.

Hole part 7 is a through hole provided in a part of fixing member 1.

Bag part 2a and bag part 2b are disposed in a bag shape with hole part 7 therebetween in the central axis direction of hole part 7. Bag part 2a and bag part 2b are composed of bag members different from each other. In the state where they are open to hole part 7 side, opening edges of bag part 2a and bag part 2b are fixed to fixing member 1 with an adhesive agent, for example. In this manner, bag part 2a and bag part 2b can share the internal space through hole part 7. In addition, with a pressing force of pressing against workpiece 6 in the central axis direction of hole part 7, one of bag part 2a and bag part 2b can deform to conform to the shape of workpiece 6 at the contact portion as illustrated in FIG. 2, and the other of bag part 2a and bag part 2b can expand in accordance with the deformation, for example.

Bag parts 2a and 2b are filled with powder 8 and air.

Desirably, the size of hole part 7 is set such that powder 8 can freely pass through hole part 7 and fixing member 1 can have a sufficient reactive force against workpiece 6 when suction gripper 14 is pressed against workpiece 6.

When the shape of powder 8 is close to a spherical shape, the fluidity in bag parts 2a and 2b is high and bag parts 2a and 2b easily conform to the shape of workpiece 6; however, the solidification force is small since the surface friction between the powders 8 is small. On the other hand, when the shape of powder 8 has a largely undulating and distorted shape, the solidification force is large since the surface friction between the powders 8 is large; however, the fluidity in bag parts 2a and 2b is low and consequently bag parts 2a and 2b less conform to the shape of workpiece 6. Therefore, it is desirable to select the type of powder 8 in accordance with workpiece 6. For example, powder 8 is ground coffee powder. When coffee powder is used as powder 8, a good balance between the above-described surface friction and fluidity, which are inconsistent with each other, can be achieved in comparison with other powders with the same diameter. The fluidity may be increased by using powder 8 having a spherical shape, by reducing the amount of the powder, or the like.

Fixing member 1 is provided with through hole 1a extending from the inner peripheral surface of hole part 7 to the outer peripheral surface of fixing member 1. Port 4 is provided at the opening of through hole 1a on the side opposite hole part 7 side. With this configuration, hardening unit 3 can change the pressure in bag parts 2a and 2b through connecting member 5, port 4, and through hole 1a.

Filter 9 is disposed to close the opening of through hole 1a on hole part 7 side. Filter 9 is disposed such that only the fluid is passed therethrough to the outside of bag parts 2a and 2b when powder 8 and the fluid in bag parts 2a and 2b are suctioned. Note that filter 9 may be disposed to close the opening of through hole 1a on port 4 side, or may be disposed inside through hole 1a.

Desirably, filter 9 has a strength with which no plastic deformation occurs even with a reactive force that is generated when bag part 2a or bag part 2b is pressed against workpiece 6.

The roughness of filter 9 is far smaller than the diameter of powder 8. It should be noted that, when there is a risk that powder 8 may be shattered, it is necessary to insert filter 9 as a filter that allows only powder 8 of a particle size smaller than or equal to the size that will not cause failure of hardening unit 3 even when hardening unit 3 performs suctioning, or it is necessary to insert such a filter inside connecting member 5. In such a case, the roughness of the filter is 5 μm, for example.

Figure 4:
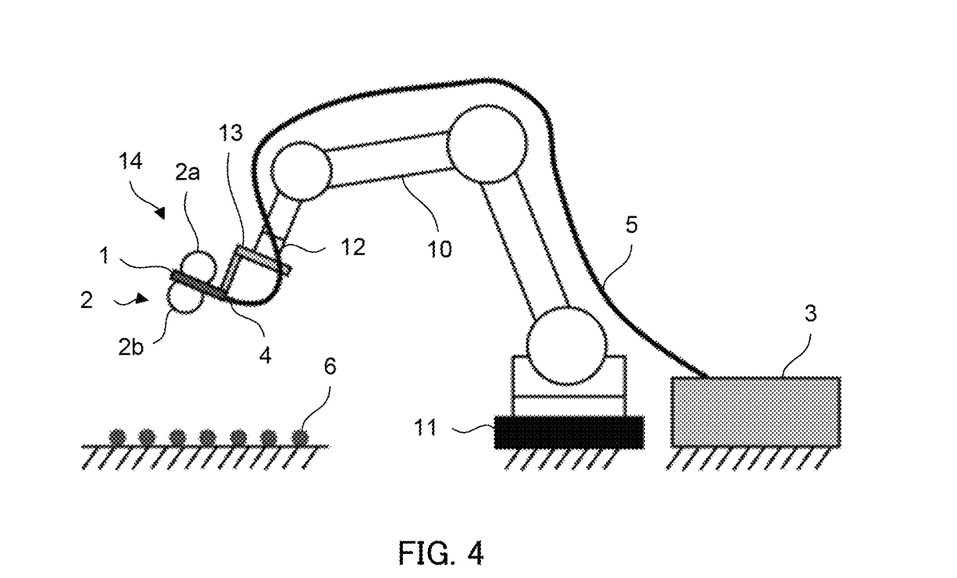
FIG. 4 is a schematic side view of a grasping system of Embodiment 1 of the present disclosure.

A grasping system according to Embodiment 1 is described below. FIG. 4 is a schematic side view of the grasping system of Embodiment 1.

Suction gripper 14 is attached to attachment metal fitting 13 mounted in arm end part 12 of robot arm 10. Robot arm 10 can three-dimensionally move within a predetermined movable range, and can freely have postures. While robot arm 10 is a vertically articulated robot fixed to the top surface of robot support 11 in this example, this is not limitative, and may be a scara robot or a parallel link robot, for example.

While workpiece 6 is directly placed on a floor surface in this example, this is not limitative, and may be placed inside a container or the like, for example. Suction gripper 14 can stably grasp workpiece 6 even when the orientation of workpiece 6 varies since bag part 2a or bag part 2b conforms to the shape of workpiece 6.

In addition, when workpieces 6 are close to each other, it is desirable to control robot arm 10 so as not to grasp a target workpiece 6 and another adjacent workpiece 6 at the same time.

Hardening unit 3, which is connected to port 4 with connecting member 5, depressurizes the interior of bag parts 2a and 2b to harden bag parts 2a and 2b after suction gripper 14 is pressed against workpiece 6 by robot arm 10. In this manner, suction gripper 14 grasps workpiece 6. In addition, hardening unit 3 resets the interior of bag parts 2a and 2b to atmosphere pressure to thereby soften bag parts 2a and 2b. In this manner, suction gripper 14 releases the grasp of workpiece 6.

While hardening unit 3 is disposed on a floor surface in this example, hardening unit 3 may be disposed in any place as long as the function of hardening and softening bag parts 2a and 2b is not impaired. For example, it may be fixed to the robot arm.

Connecting member 5 is a urethane tube, for example. In this case, the outer diameter of the urethane tube is 3 mm when bag parts 2a and 2b have a diameter of approximately 20 mm, for example. The hardening responsiveness of bag parts 2a and 2b can be increased by increasing the diameter of the urethane tube; however, the maneuverability becomes poor since the bend radius of the urethane tube is also increased.

Figure 5:
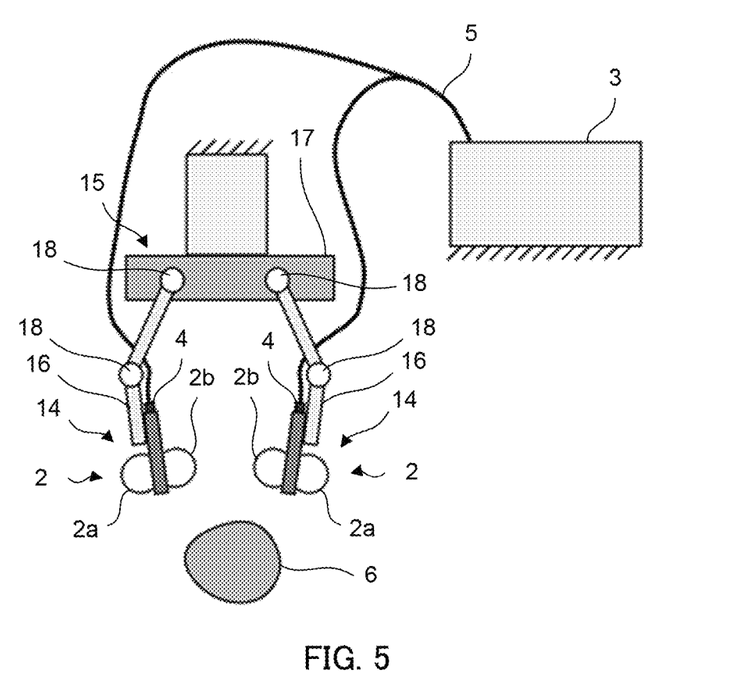
FIG. 5 is a schematic side view of another example of the grasping system of Embodiment 1 of the present disclosure.

FIG. 5 is a schematic side view of another example of the grasping system of Embodiment 1. In this example, the above-described suction gripper 14 is provided at each of two fingertip parts 16 of two-finger gripper 15. In FIG. 5, the reference numeral 17 represents a palm part. Two fingertip parts 16, each of which is provided with two joint parts 18, can change the position with respect to palm part 17.

Two-finger gripper 15 drives joint parts 18 to sandwich workpiece 6 between fingertip parts 16, and deforms bag part 2b of grasping part 2 of each suction gripper 14 such that bag part 2b conforms to the shape of workpiece 6, while expanding bag part 2a in accordance with the deformation. Thereafter, hardening unit 3 hardens bag parts 2a and 2b. In this manner, two suction grippers 14 grasp workpiece 6. In addition, after hardening unit 3 softens bag parts 2a and 2b, two-finger gripper 15 opens fingertip part 16. In this manner, two suction grippers 14 releases the grasp of workpiece 6.

While fingertip part 16 is opened after the shapes of bag parts 2a and 2b are softened when releasing the grasp in this example, this is not limitative, and the shapes of bag parts 2a and 2b may be softened after fingertip part 16 is opened first, in the case where workpiece 6 cannot be grasped with the grasping force of suction gripper 14 alone.

In comparison with a case where fingertip part 16 is not provided with suction gripper 14 and fingertip part 16 directly grasps workpiece 6, the grasping system of Embodiment 1 can achieve more stable grasp not only by simply acting both the grasping force of two-finger gripper 15 and the grasping force of suction gripper 14, but also by bag parts 2a and 2b conforming to the shape of workpiece 6.

While suction gripper 14 is provided only at fingertip part 16 of two-finger gripper 15 in this example, this is not limitative, and suction gripper 14 may be provided also at palm part 17, for example. In the case where suction gripper 14 is attached also at palm part 17, more stable grasp can be advantageously achieved by gripping workpiece 6 using both fingertip part 16 and palm part 17.

In addition, while suction gripper 14 is attached to two-finger gripper 15 in this example, this is not limitative, and suction gripper 14 may be attached to a multiple finger hand with three or more fingers.

Embodiment 2

Figure 6:
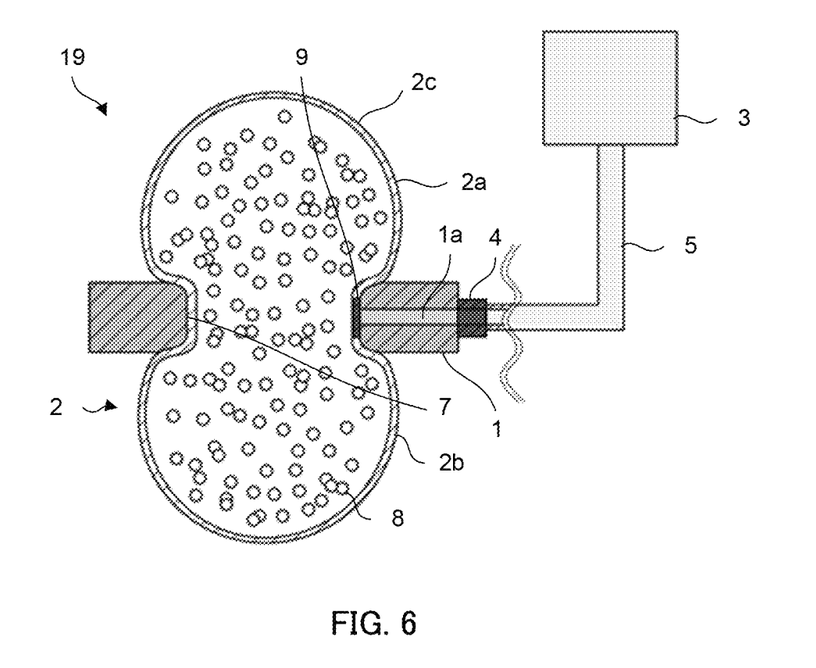
FIG. 6 is a side sectional view illustrating a suction gripper of Embodiment 2 of the present disclosure.

FIG. 6 is a side sectional view of suction gripper 19 of Embodiment 2 of the present disclosure.

As in Embodiment 1, grasping part 2 of suction gripper 19 of Embodiment 2 includes two bag parts 2a and 2b disposed with hole part 7 therebetween in the central axis direction of hole part 7. However, unlike in Embodiment 1, two bag parts 2a and 2b of Embodiment 2 is composed of one bag member 2c extending through the interior of hole part 7. That is, in present disclosure, the bag part of grasping part 2 may not necessarily be members having shapes of separate bags.

In Embodiment 2, bag member 2c is provided with a hole, and filter 9 is fixed with an adhesive agent so as to close the hole, for example. With filter 9 arranged to close the opening of through hole 1a on the hole part 7 side, bag member 2c is disposed through hole part 7. With this configuration, as in Embodiment 1, suction gripper 19 can grasp a workpiece and release the grasp by changing the pressure of the interior of bag parts 2a and 2b using hardening unit 3 through connecting member 5, port 4, through hole 1a and filter 9.

Embodiment 3

Figure 7:
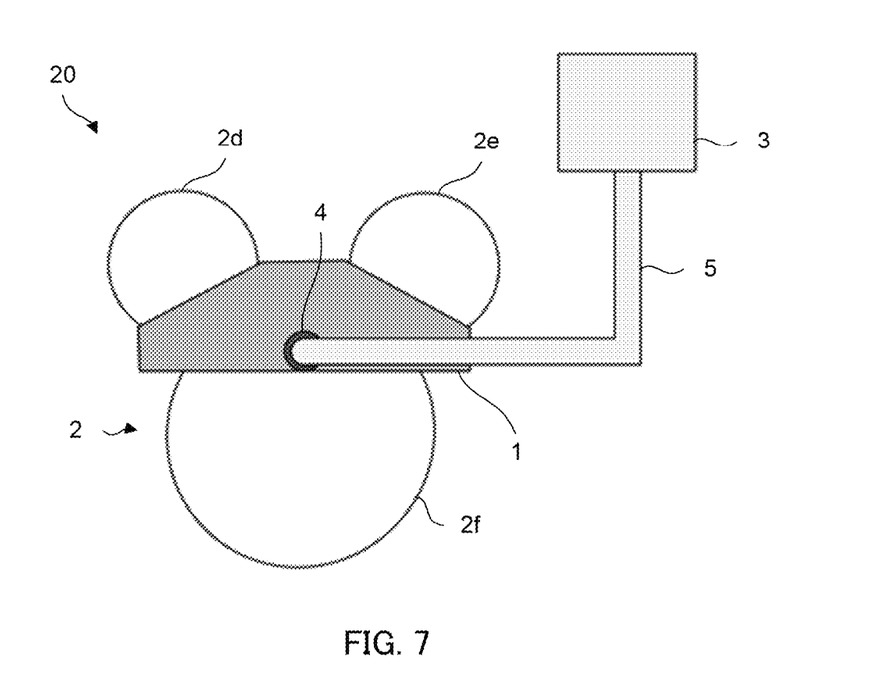
FIG. 7 is a schematic side view of a suction gripper of Embodiment 3 of the present disclosure.

FIG. 7 is a schematic side view of suction gripper 20 of Embodiment 3 of the present disclosure.

Embodiment 3 is identical to Embodiment 1 except that three bag parts are provided in grasping part 2. Bag part 2d, bag part 2e and bag part 2f are disposed in a Y-shape with two parts (bag part 2d and bag part 2e) disposed on one side and another part (bag part 2f) disposed on the other side with respect to fixing member 1.

Figure 8:
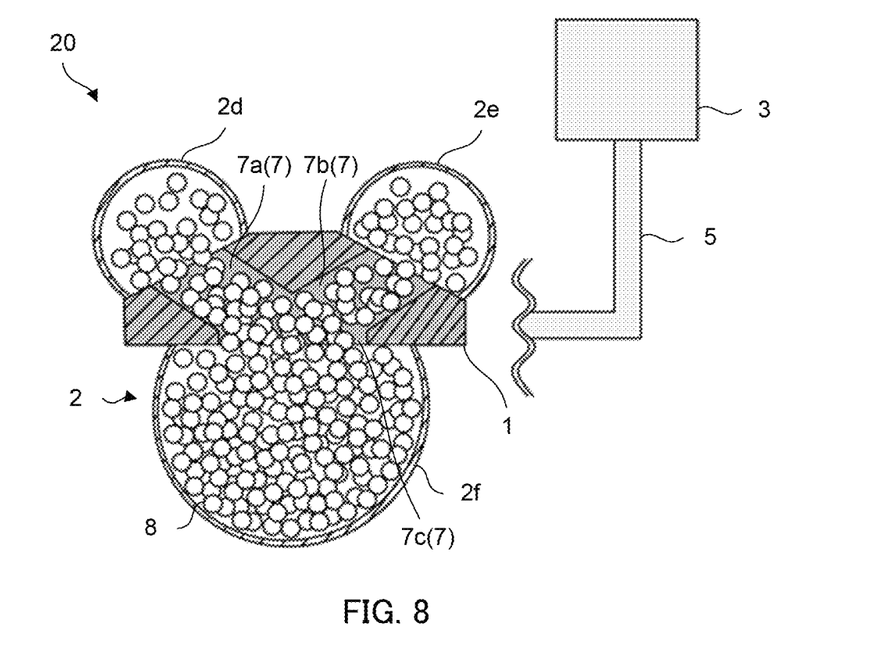
FIG. 8 is a side sectional view illustrating the suction gripper of Embodiment 3 of the present disclosure.

FIG. 8 is a side sectional view of suction gripper 20 of Embodiment 3. Bag part 2d, bag part 2e and bag part 2f are composed of separate bag members. In fixing member 1, hole 7a, hole 7b and hole 7c are provided at the portions corresponding to the openings of bag part 2d, bag part 2e and bag part 2f, respectively. Hole 7a, hole 7b and hole 7c form hole part 7 and are disposed to intersect one another in a Y-shape. In this manner, bag part 2d, bag part 2e and bag part 2f can share the internal space through hole part 7. In addition, when workpiece 6 is pushed thereto, one or two of bag part 2d, bag part 2e and bag part 2f can deform to conform to the shape of workpiece 6 at the contact portion, and the remaining bag part can expand in accordance with the deformation, for example.

In addition, fixing member 1 is provided with a through hole (not illustrated) communicating between hole part 7 and port 4. With this configuration, suction gripper 20 can grasp a workpiece and release the grasp by changing the pressure of the interior of bag part 2d, bag part 2e and bag part 2f using hardening unit 3 through connecting member 5, port 4, and the through hole, as in Embodiment 1.

Bag part 2d and bag part 2e may be freely disposed on fixing member 1. With this configuration, bag part 2d and bag part 2e may be disposed so as to avoid interference with members around suction gripper 20, for example. It is preferable that the shape of hole part 7 be set such that the fluidity of powder 8 is not impaired between bag parts 2d to 2f.

When bag part 2d and bag part 2e disposed on the same side have a volume smaller than that of bag part 2f disposed the other side, suction gripper 20 can be advantageously flattened.

With bag parts 2d to 2f of different sizes, the bag parts can be used in accordance with the type of workpiece 6 such that small bag part 2d or bag part 2e is used to grasp small workpiece 6 while large bag part 2f is used to grasp large workpiece 6.

When suction gripper 20 are configured in a 3-fold rotational symmetric shape in the side view of FIG. 7 with bag part 2d, bag part 2e and bag part 2f equal to each other, workpiece 6 can be equally grasped in the three directions at an interval of 120 degrees in the rotational direction of the symmetric axis.

Note that bag part 2d, bag part 2e and bag part 2f of Embodiment 3 may be composed of one bag member extending through hole part 7 as with bag member 2c of Embodiment 2.

While grasping part 2 of Embodiment 3 includes three bag parts, bag part 2d, bag part 2e and bag part 2f, the present invention is not limited thereto, and four or more bag parts may be provided, for example. For example, four bag parts may be disposed at the top, bottom, left and right of fixing member 1, or six bag parts may be disposed at the top, bottom, left, right, front and rear of fixing member 1. It suffices that the bag parts included in grasping part 2 share the internal space through hole part 7.

In Embodiments 1 to 3, bag parts 2a, 2b, 2d, 2e and 2f may be filled with particles instead of powder 8, or may be filled with powder 8 and particles.

Note that suction gripper 19 of Embodiment 2 and suction gripper 20 of Embodiment 3 may be applied to the grasping system exemplified in Embodiment 1.

The embodiments described above should be taken as illustrative and not restrictive to the scope of the invention.

The disclosure is not limited to the embodiments, and various modifications may be made in so far as they are within the scope of the appended claims or the equivalents thereof.

This application is entitled to and claims the benefit of Japanese Patent Application No. 2019-193558 filed on Oct. 24, 2019, the disclosure each of which including the specification, drawings and abstract is incorporated herein by reference in its entirety.

INDUSTRIAL APPLICABILITY

The suction gripper of the present disclosure can stably grasp more kinds of workpieces with increased deformable capacity of the bag member, and is applicable not only to the application to FA for small volume production of large number of kinds of products, but also to service robots such as delivery robots.

REFERENCE SIGNS LIST

1 Fixing member
1a Through hole
2 Grasping part
2a, 2b, 2d, 2e, 2f Bag part
2c Bag member
3 Hardening unit
4 Port
5 Connecting member
6 Workpiece
7 Hole part 7a Hole
7b Hole
7c Hole
8 Powder
9 Filter
10 Robot arm
11 Robot support
12 Arm end part
13 Attachment metal fitting
14, 19, 20 Suction gripper
15 Two-finger gripper
16 Fingertip part
17 Palm part
18 Joint part

The invention claimed is:

1. A suction gripper configured to grasp a workpiece, the suction gripper comprising:
    a fixing member including a hole part;
    a grasping part including a plurality of bag parts, the plurality of bag parts being disposed with the hole part interposed between the plurality of bag parts such that interiors of the plurality of bag parts are coupled together in a central axis direction of the hole part, the interiors of the plurality of bag parts being filled with powder or particles and fluid, the plurality of bag parts having flexibility and airtightness; and
    a hardening unit configured to harden the plurality of bag parts,
    wherein the grasping part has a configuration in which when the workpiece is pushed against any of the plurality of bag parts, the plurality of bag parts share the powder or the particles and fluid in the interiors with each other through the hole part such that a contact portion of the any of the plurality of bag parts with the workpiece deform to conform to a shape of the workpiece while another bag part of the plurality of bag parts expands in accordance with deformation of the contact portion.

2. The suction gripper according to claim 1, wherein the plurality of bag parts is composed of one bag member extending through an interior of the hole part.

3. The suction gripper according to claim 1, wherein the plurality of bag parts is composed of a plurality of bag members whose internal spaces are coupled together through the hole part, the plurality of bag members being fixed to the fixing member.

4. The suction gripper according to claim 1, wherein the hardening unit depressurizes the plurality of bag parts to harden the plurality of bag parts.

* * * * *